(12) United States Patent  
Liang et al.

(10) Patent No.: US 11,542,983 B2  
(45) Date of Patent: Jan. 3, 2023

(54) MOTION GUIDE DEVICE

(71) Applicant: THK Co., LTD., Tokyo (JP)

(72) Inventors: Yunlei Liang, Dalian (CN); Rendong Li, Dalian (CN); Jixun Sha, Dalian (CN); Tsutomu Togashi, Dalian (CN); Soshi Miyahara, Dalian (CN); Masakazu Takahashi, Dalian (CN); Kaoru Hoshide, Dalian (CN); Katsuya Iida, Dalian (CN)

(73) Assignee: THK CO., LTD., Tokyo (JP)

(*) Notice: Subject to any disclaimer, the term of this patent is extended or adjusted under 35 U.S.C. 154(b) by 0 days.

(21) Appl. No.: 17/272,456

(22) PCT Filed: Aug. 12, 2019

(86) PCT No.: PCT/CN2019/100235  
§ 371 (c)(1),  
(2) Date: Mar. 1, 2021

(87) PCT Pub. No.: WO2020/048293  
PCT Pub. Date: Mar. 12, 2020

(65) Prior Publication Data  
US 2021/0317872 A1    Oct. 14, 2021

(30) Foreign Application Priority Data  
Sep. 3, 2018    (CN) .......................... 201811022124.4

(51) Int. Cl.  
*F16C 29/06*    (2006.01)  
*F16C 29/04*    (2006.01)

(52) U.S. Cl.  
CPC .......... *F16C 29/0607* (2013.01); *F16C 29/04* (2013.01); *F16C 29/065* (2013.01)

(58) Field of Classification Search  
CPC .. F16C 29/04; F16C 29/0602; F16C 29/0604; F16C 29/0607; F16C 29/0633;  
(Continued)

(56) References Cited

U.S. PATENT DOCUMENTS 5,984,254 A    11/1999  Baloche et al.  
6,939,045 B1    9/2005  Shing-Neng et al.  
(Continued)

FOREIGN PATENT DOCUMENTS

CN    1182685 A    5/1998  
CN    2581744 Y    10/2003  
(Continued)

OTHER PUBLICATIONS

Office Action dated Jul. 5, 2021, issued in counterpart CN Application No. 201811022124.4, with English Translation. (10 page).  
(Continued)

*Primary Examiner* — James Pilkington  
(74) *Attorney, Agent, or Firm* — WHDA, LLP

(57) ABSTRACT

A motion guide device includes: a supporting body; a movable body which is movable along the supporting body; a roller which is configured to be rollable between the supporting body and the movable body; a roller holding member which is provided on the movable body to hold the roller, wherein the roller holding member comprises an upper roller holding member and a lower roller holding member, a protrusion is formed on the lower roller holding member, the protrusion is in a length direction of the movable body and opposite to a foot of the movable body, an opening is formed on the foot, the opening is opened to a side of the supporting body in the length direction to receive the protrusion, a protrusion width of the protrusion is greater than an opening width of the opening.

4 Claims, 11 Drawing Sheets

(58) Field of Classification Search
CPC .............. F16C 29/0635; F16C 29/0642; F16C 29/065; F16C 2226/76
See application file for complete search history.

(56) References Cited

U.S. PATENT DOCUMENTS

| | | | | |
|---|---|---|---|---|
| 7,434,999 | B2* | 10/2008 | Kuwabara | F16C 33/51 |
| | | | | 384/44 |
| 8,961,016 | B2* | 2/2015 | Nakagawa | F16C 29/088 |
| | | | | 384/15 |
| 9,022,654 | B2* | 5/2015 | Liao | F16C 33/6681 |
| | | | | 384/13 |
| 2009/0252442 | A1 | 10/2009 | Michioka et al. | |
| 2009/0290820 | A1 | 11/2009 | Hsu | |
| 2015/0093053 | A1 | 4/2015 | Liao | |

FOREIGN PATENT DOCUMENTS

| | | | |
|---|---|---|---|
| CN | 101629600 | A | 1/2010 |
| CN | 201934503 | * | 8/2011 |
| CN | 201934503 | U | 8/2011 |
| CN | 103388624 | A | 11/2013 |
| CN | 203453292 | U | 2/2014 |
| CN | 106812796 | A | 6/2017 |
| JP | 2009085333 | A | 4/2009 |
| JP | 2009-108969 | A | 5/2009 |
| JP | 2013-231466 | A | 11/2013 |
| JP | 6131530 | B2 | 5/2017 |
| TW | 200734552 | A | 9/2007 |
| WO | WO2007/017688 | * | 2/2007 |

OTHER PUBLICATIONS

International Search Report dated Oct. 30, 2019, issued in counterpart International Application No. PCT/CN2019/100235, with English Translation. (6 pages).
Written Opinion of the International Searching Authority (Form PCT/ISA/237) dated Oct. 30, 2019, issued in counterpart International Application No. PCT/CN2019/100235, w/English Translation. (5 pages).
Office Action dated Feb. 16, 2022, issued in counterpart CN Application No. 201811022124.4, with English Translation. (21 pages).
Office Action dated Aug. 23, 2022, issued in counterpart JP Application No. 2021-510961, with English Translation. (10 pages).
Office Action dated Aug. 9, 2022, issued in counterpart TW Application No. 108131534, with English Translation. (10 pages).

* cited by examiner

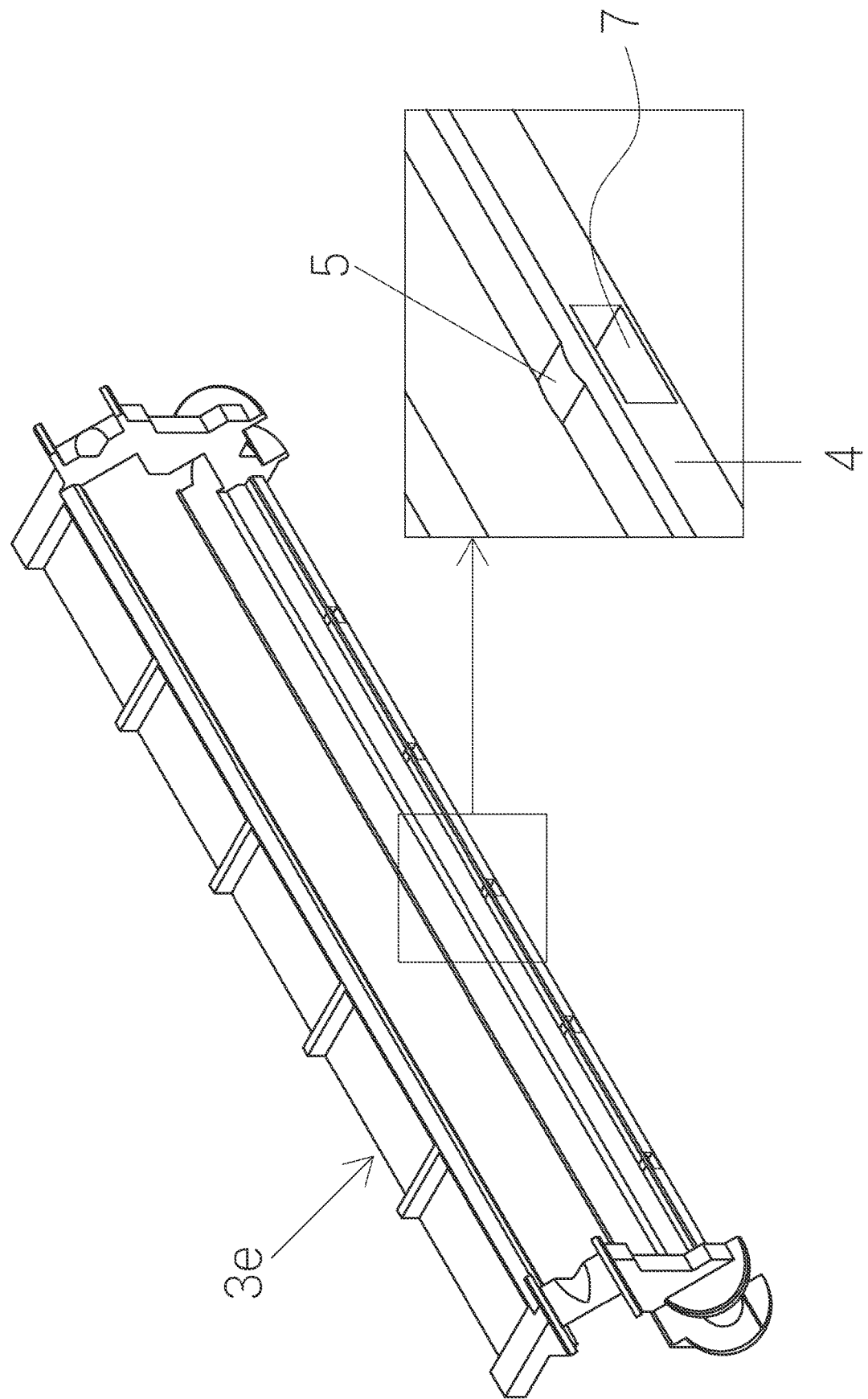

MOTION GUIDE DEVICE

TECHNICAL FIELD

The present disclosure relates to a motion guide device, and specifically to a motion guide device provided with a protrusion that holds a roller holding member and prevents the roller from deviation.

BACKGROUND

A linear guide as a type of motion guide device includes a track and a movable body mounted in a way that is movable along the track. A plurality of rollers that are rollable are arranged between the track and the movable body. A plurality of rollers circulate in a ring-shaped roller circulation path. The roller circulation path includes a load path, a no-load path and a direction changing path. The load path is defined by a track-side roller rolling surface provided on the track and a slider-side roller rolling surface provided on the movable body and opposite to the track-side roller rolling surface on the track. The no-load path is provided on the movable body and parallel to the load path. The direction changing path is in a U shape, provided on the movable body, and connects an end of the load path and an end of the no-load path.

In the above-mentioned linear guide, it is necessary to hold the roller holding member to prevent the roller rolling in the load path from deviation.

For example, Patent Document 1 discloses a motion guide device in which a protrusion formed on a retainer and a recess formed on a foot of a slider are combined with each other to form a combination, and the combination is formed at the center of the retainer in a length direction thereof. The protrusion of the retainer is formed to protrude toward the foot at a position facing a surface at the foot side of the slider and opposite to a lower part of the foot. Moreover, in a plan view, an outer peripheral shape of the protrusion is a hollow cylindrical shape, and an end on the foot side of the hollow cylindrical shape is cut off, so that the protrusion has a U shape that opens to the foot. In addition, the recess of the slider has an opening at a position opposite to the protrusion of the retainer. The protrusion is inserted into the recess from the opening. Due to the elastic deformation of the protrusion, the protrusion is engaged with the recess, thereby preventing or suppressing the center portion of the retainer from bending toward the track side.

However, the combination in this Patent Document 1 has the following technical problems.

First, the protrusion is formed into a hollow cylindrical U-shape, so that it is complicated and difficult to proceed it.

Secondly, since the protrusion is formed only at the central portion of the retainer in the length direction, it is difficult to reliably prevent the retainer from bending.

Finally, since the rolling elements are balls, there is no technical effect to prevent the rollers from deviation.

Patent Document 1: JP Patent No. 6131530

SUMMARY

The present disclosure is proposed to solve the above-mentioned drawbacks, and aims to provide a motion guide device provided with a protrusion that holds a roller holding member and prevents the roller from deviation.

In order to achieve the above-mentioned objective, the present disclosure provides a motion guide device, including: a supporting body; a movable body which is movable along the supporting body; a roller which is configured to be rollable between the supporting body and the movable body; a roller holding member which is provided on the movable body to hold the roller, wherein the roller holding member includes an upper roller holding member and a lower roller holding member, the motion guide device is characterized in that, a protrusion is formed on the lower roller holding member, the protrusion is in a length direction of the movable body and opposite to a foot of the movable body, an opening is formed on the foot, the opening is opened to a side of the supporting body in the length direction to receive the protrusion, and a protrusion width of the protrusion is greater than an opening width of the opening.

Technical Effect

In the motion guide device according to the present disclosure, the protrusion is engaged with the opening, the deformation of the lower roller holding member may be suppressed, so as to prevent the roller from dropping and deviation, and suppress a fluctuation in the rolling resistance of the roller.

BRIEF DESCRIPTION OF THE DRAWINGS

FIG. 11 is a perspective view of the roller holding member of the motion guide device according to still other embodiments of the present disclosure, wherein a frame portion represents an enlarged view of the protrusion.

Figure 1:
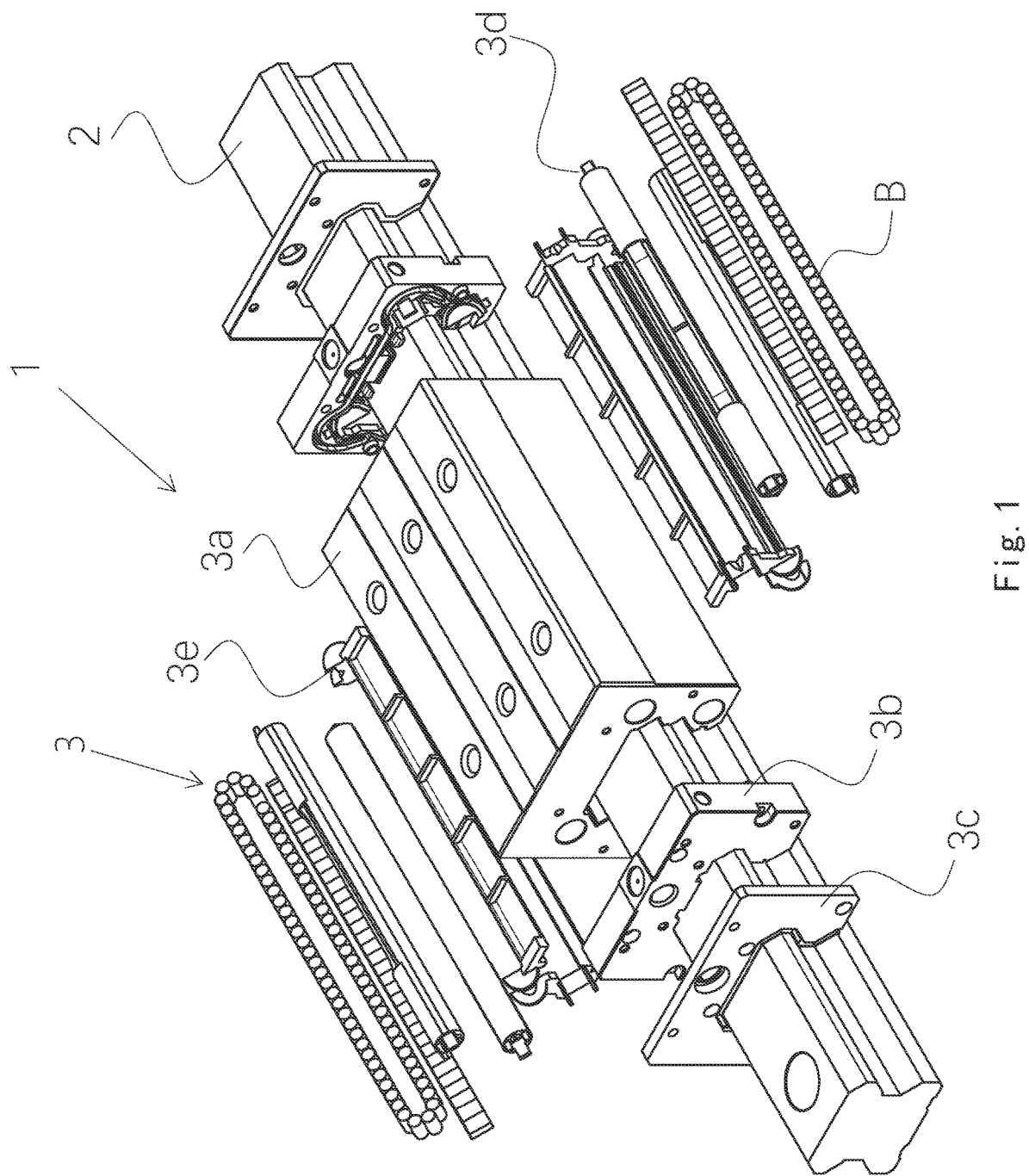
FIG. 1 is an exploded perspective view of a motion guide device according to the present disclosure.

LIST OF REFERENCE NUMERALS 1 linear slider (motion guide device)
2 track (supporting body)
2m track side roller rolling surface
3 movable block (movable body)
3a slider (movable main body)
3a1 opening
3a11 upper surface
3a12 lower surface
3a13 bottom surface
3a2 projection
3am slider side roller rolling surface
3b end cover plate (cover body)
3c end cover plate seal
3d tube
3e roller holding member
3e1 upper roller holding member
3e2 lower roller holding member
3e21 holding member body
3e22 circulating component
4 protrusion
5 convex portion
6 restriction surface
7 hollow portion
B roller
Bm end surface
Bn chamfer

DETAILED DESCRIPTION OF EMBODIMENTS

Hereinafter, structures and functions of various parts according to the present disclosure will be described in detail with reference to the drawings. In addition, in the following description, the same or corresponding members or structures are denoted by the same reference numerals, and redundant descriptions are omitted.

Figure 2:
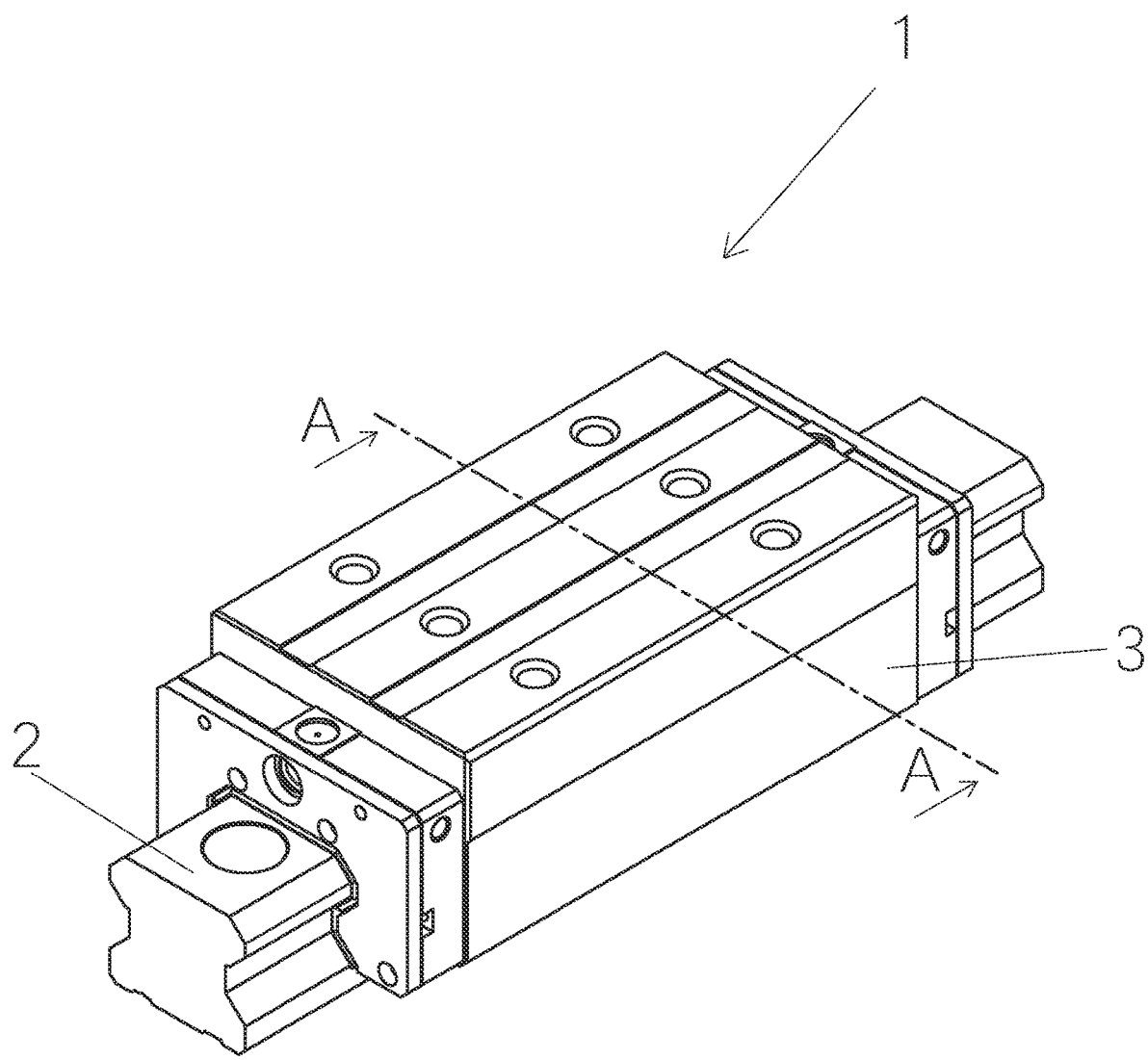
FIG. 2 is an assembled perspective view of the motion guide device of the present disclosure.

As shown in FIGS. 1 and 2, a linear guide 1 as a type of motion guide device includes a track 2 and a movable body 3 that is movable freely along the track 2. The movable body 3 relatively linearly moves relative to the track 2 in a length direction of the track 2. In addition, the track 2 is mounted on a fixed side such as a base, and the movable body 3 is used to mount a guided object such as a workbench.

Furthermore, as shown in FIG. 1, the movable body 3 includes a slider 3a, end cover plates 3b and end cover plate seals 3c. The end cover plates 3b are respectively disposed on the slider 3a at both ends in the moving direction of the slider 3a. The end cover plate seals 3c are respectively disposed on faces of the end cover plates 3b opposite to faces on which the slider 3a is disposed, and are configured to seal the end cover plates 3b, respectively. Further, a plurality of rollers B are provided between the track 2 and the movable body 3, and the plurality of rollers B are rollable, so that the movable body 3 may linearly move relative to the track 2 in the length direction of the track 2. A plurality of rollers B are circulated in a ring-shaped roller circulation path. The roller circulation path includes a load path, a no-load path and a direction changing path. The load path is defined by a track-side roller rolling surface 2m (see FIG. 10) provided on the track 2 and a slider-side roller rolling surface 3am (see FIG. 10) provided on the movable body 3 and opposite to the track-side roller rolling surface 2m on track 2. The no-load path is on the movable body 3 and parallel to the load path. The direction changing path is in a U shape, provided on the movable body 3, and connects an end of the load path and an end of the no-load path.

Figure 10:
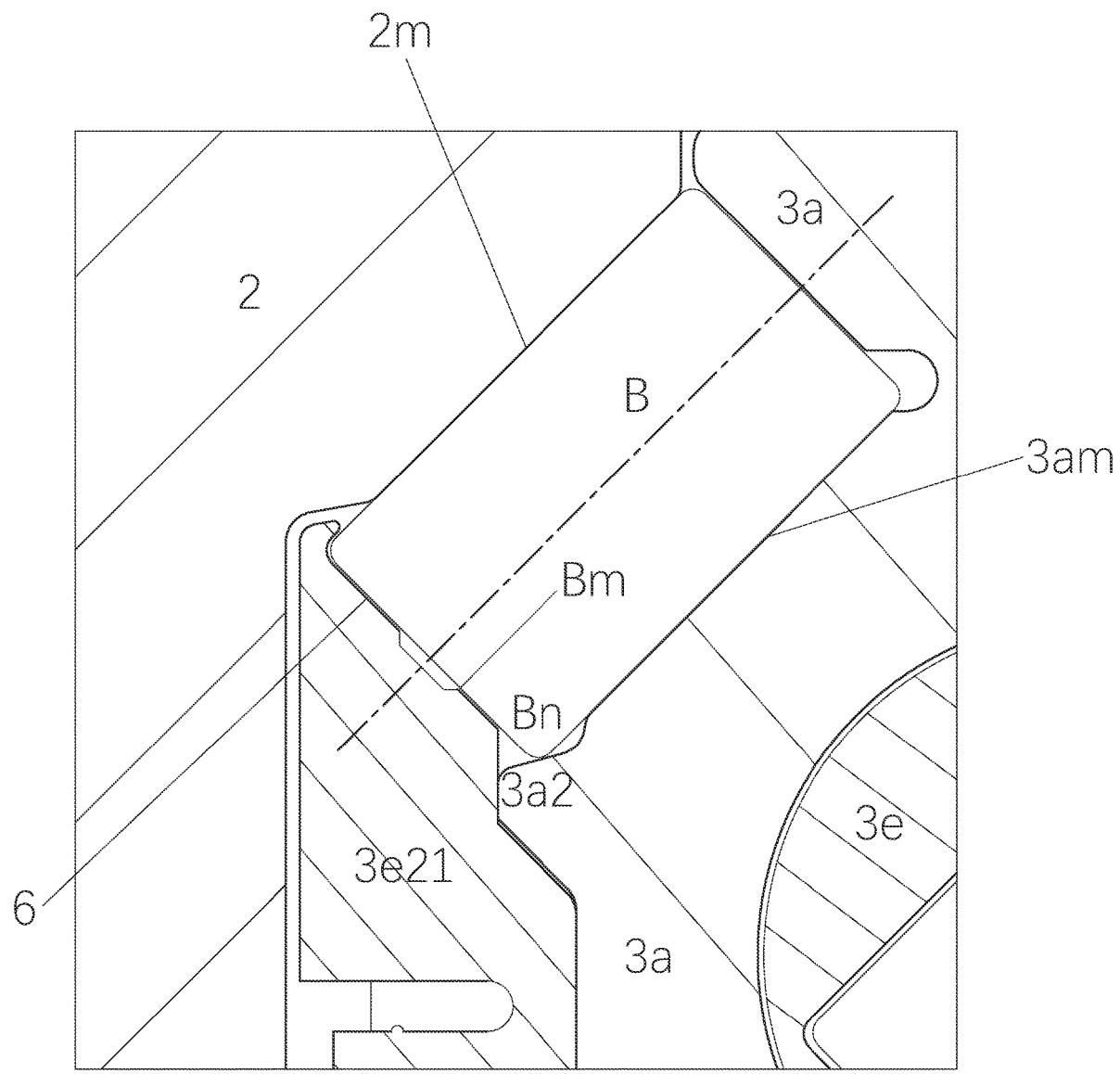
FIG. 10 is a cross-sectional view of the projection shown in FIG. 9 taken along the line A-A in FIG. 2.

Furthermore, as shown in FIG. 10 and in conjunction with FIG. 1, two track-side roller rolling surfaces 2m are formed at each of left and right sides of the track 2, respectively, and the two track-side roller rolling surfaces 2m are arranged in up-down direction. Correspondingly, two slider-side roller rolling surfaces 3am are formed at each of two sides of the slider 3 opposite to the two left and right sides of the track 2, respectively, and the two slider-side roller rolling surfaces 3am are arranged in the up-down direction. In this way, a total of four load paths are formed. Moreover, corresponding to the total of four load paths, a total of four no-load paths and a total of eight U-shaped direction changing paths are formed (four U-shaped direction changing paths are provided at each end of the movable body 3), thereby forming a total of four roller circulation paths.

Figure 3:
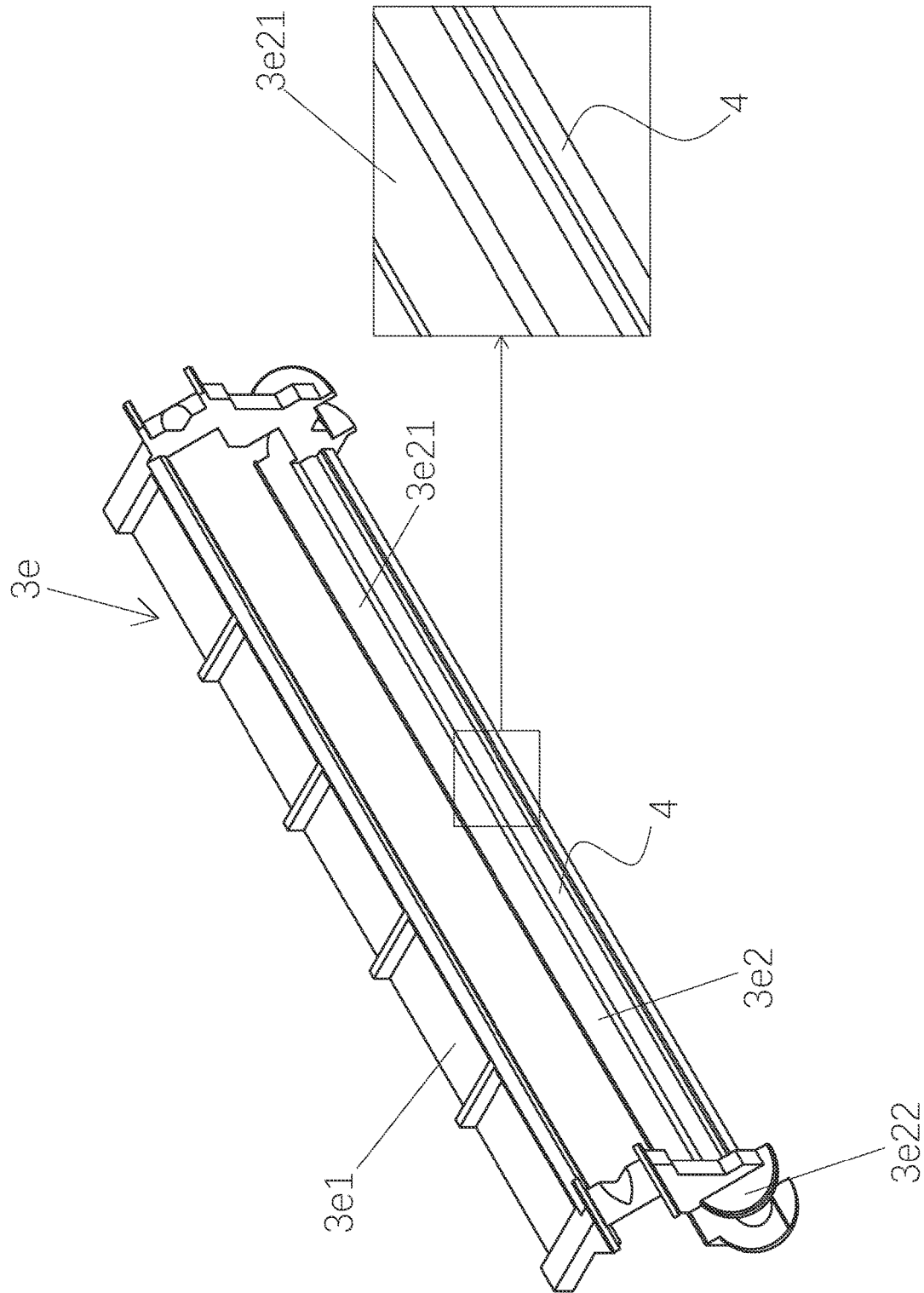
FIG. 3 is a perspective view of a roller holding member of the motion guide device according to embodiments of the present disclosure, wherein a frame portion represents an enlarged view of a protrusion provided on the roller holding member.

More specifically, as shown in FIG. 1, the no-load path is formed by inserting a tube 3d having a space through which the roller B may pass into a through hole provided in the slider 3a in the moving direction. In addition, as shown in FIG. 1, two roller holding members 3e are provided on the movable body 3 on the left and right sides of the movable body 3, respectively, for holding the roller B rolling in the load path. As shown in FIG. 3, the roller holding member 3e includes an upper roller holding member 3e1 and a lower roller holding member 3e2. The lower roller holding member 3e2 includes a holding member body 3e21 and two circulating components 3e22. The two circulating components 3e22 are integrally provided on both ends of the holding member body 3e21 in the moving direction of the movable body 3, respectively. It should be noted that, as shown in FIGS. 1 and 3, the upper roller holding member 3e1 has the same structure as the lower roller holding member 3e2, and therefore detailed description thereof is omitted. Moreover, as shown in FIG. 1, the U-shaped direction changing path is formed by fitting the circulating component 3e22 to a surface of the end plate 3b on the side of the slider 3a, whereby the roller B performs directional transition in the movable body 3.

Next, as shown in FIG. 3, a protrusion 4 is formed on the lower roller holding member 3e2, and the protrusion 4 faces a foot of the slider 3a in the length direction of the movable body 3.

Figure 4:
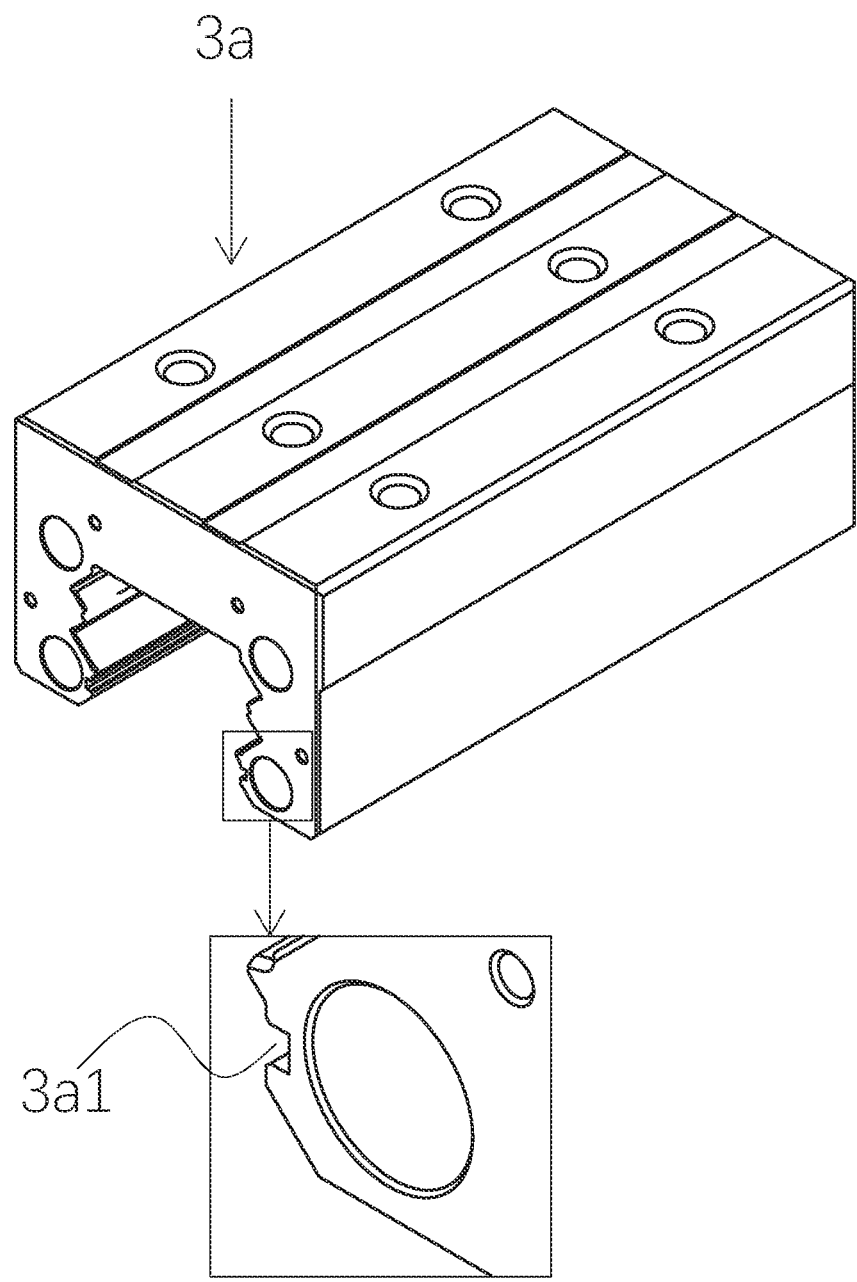
FIG. 4 is a perspective view of a movable main body of the motion guide device according to embodiments of the present disclosure, wherein a frame portion represents an enlarged view of a foot of the movable main body.
Figure 5:
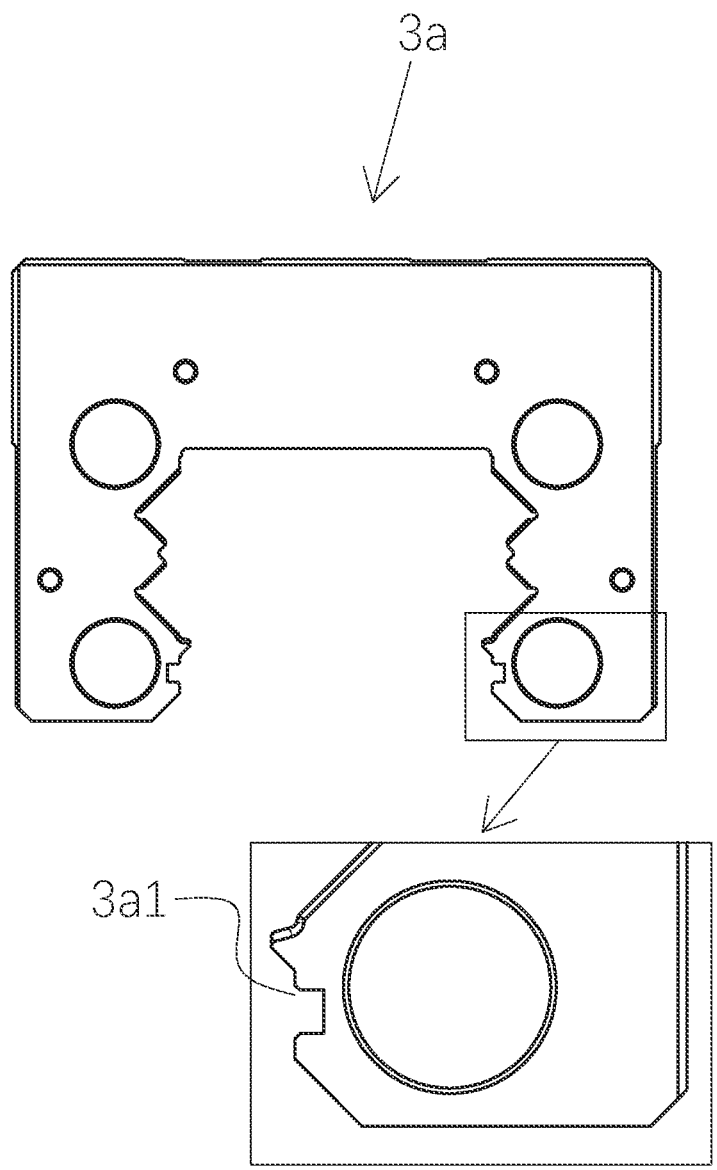
FIG. 5 is a side view of the movable main body of the motion guide device according to embodiments of the present disclosure, wherein a frame portion represents an enlarged view of the foot of the movable main body.

Further, as shown in FIGS. 4 and 5, an opening 3a1 is formed in the foot of the slider 3a, and the opening 3a1 opens to the side of the track 2 in the length direction of the movable body 3 and receives the protrusion 4.

Figure 6:
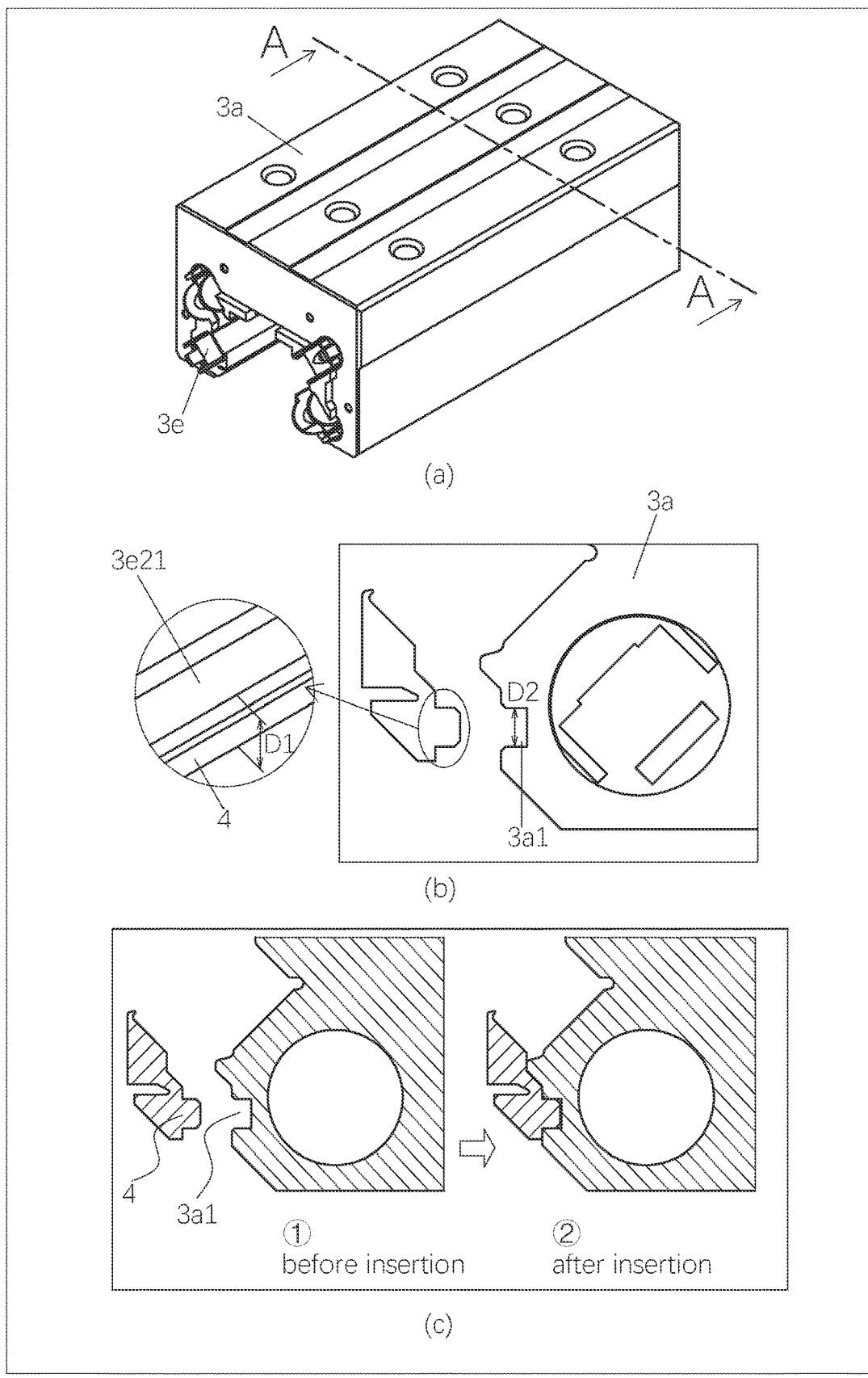
FIG. 6 is a view showing an installation state of the roller holding member shown in FIG. 3 and the movable main body shown in FIG. 4, wherein (a) is a perspective view when the roller holding member is mounted on the movable main body, (b) is a side view showing a dimensional relationship between the protrusion and the opening, and (c) is a cross-sectional view taken along line A-A in (a), showing states before and after the protrusion is inserted into the opening.

Further, FIG. 6(a) is a perspective view showing the roller holding member 3e shown in FIG. 3 is mounted on the slider 3a shown in FIG. 4, and FIG. 6(b) is a side view showing a dimensional relationship between the protrusion 4 and the opening 3a1. As shown in FIG. 6(b), a protrusion width D1 of the protrusion 4 is greater than an opening width D2 of the opening 3a1. When the roller holding member 3e shown in FIG. 3 is mounted to the slider 3a shown in FIG. 4, as shown in FIG. 6(c), the protrusion 4 and the opening 3a1 are changed from a state before insertion to a state after insertion. Since the protrusion width D1 of the protrusion 4 is greater than the opening width D2 of the opening 3a1, the protrusion 4 may be securely and firmly engaged into the opening 3a1 due to elastic deformation of the protrusion 4. In this way, the deformation of the lower roller holding member 3e2 may be suppressed, so as to prevent the roller B from dropping and deviating, and suppress fluctuation in rolling resistance of the roller B.

Figure 7:
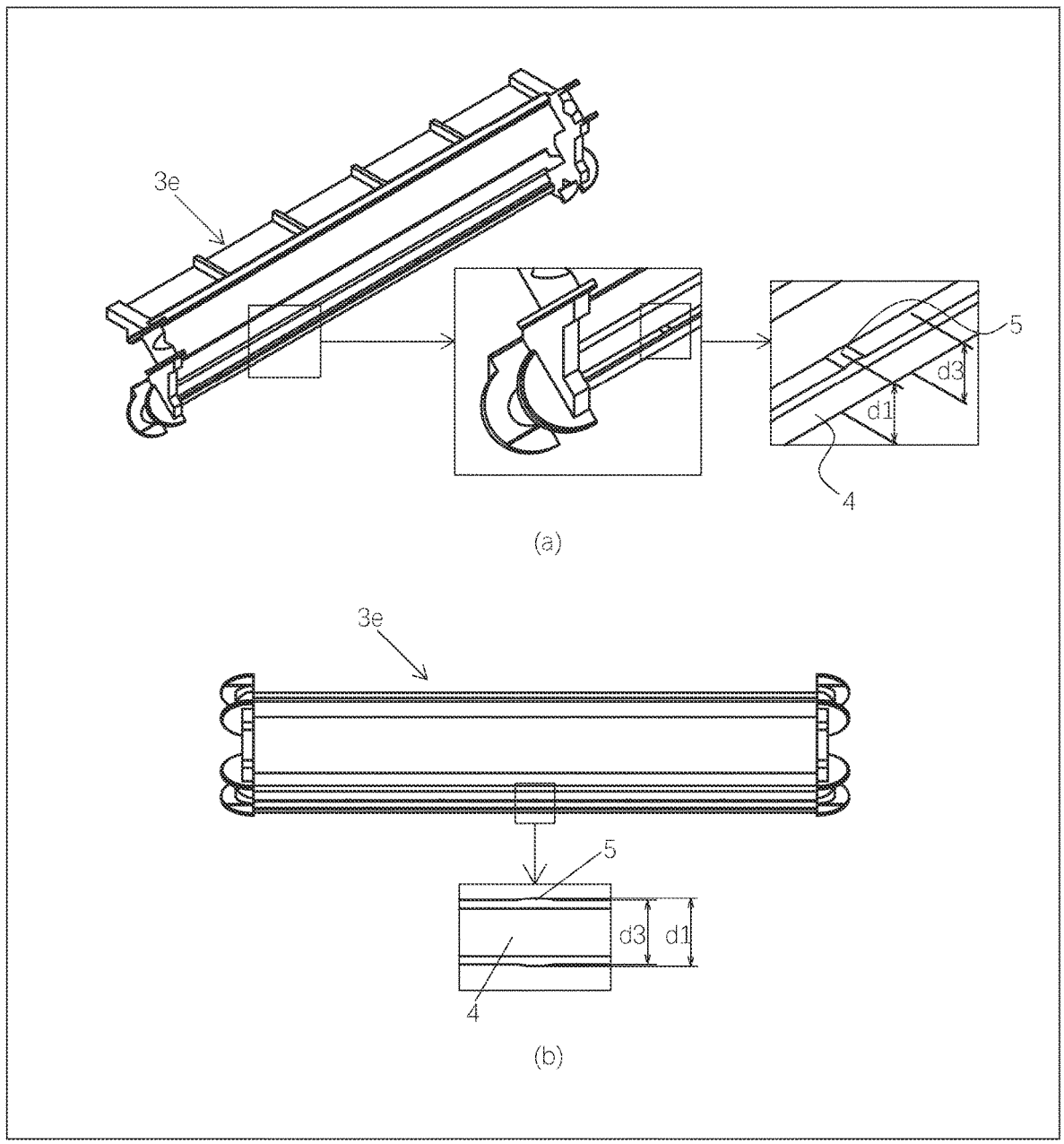
FIG. 7 is a view of the roller holding member of the motion guide device according to other embodiments of the present disclosure, wherein (a) is a perspective view of the roller holding member, and a frame portion represents an enlarged view of the protrusion and the convex portion provided on the protrusion, (b) is a front view of the roller holding member, and a frame portion represents an enlarged view of the protrusion and the convex portion provided on the protrusion.

Further, FIG. 7 is a view of the roller holding member 3e according to other embodiments. As shown in FIGS. 7(a) and (b), a plurality of convex portions 5 are provided on each of two side surfaces of the protrusion 4 of the lower roller holding member 3e2 in the up-down direction orthogonal to the moving direction of the movable body 3. The plurality of convex portions 5 may be arranged at an equal interval, and the convex portions 5 are preferably in an arc shape.

Figure 8:
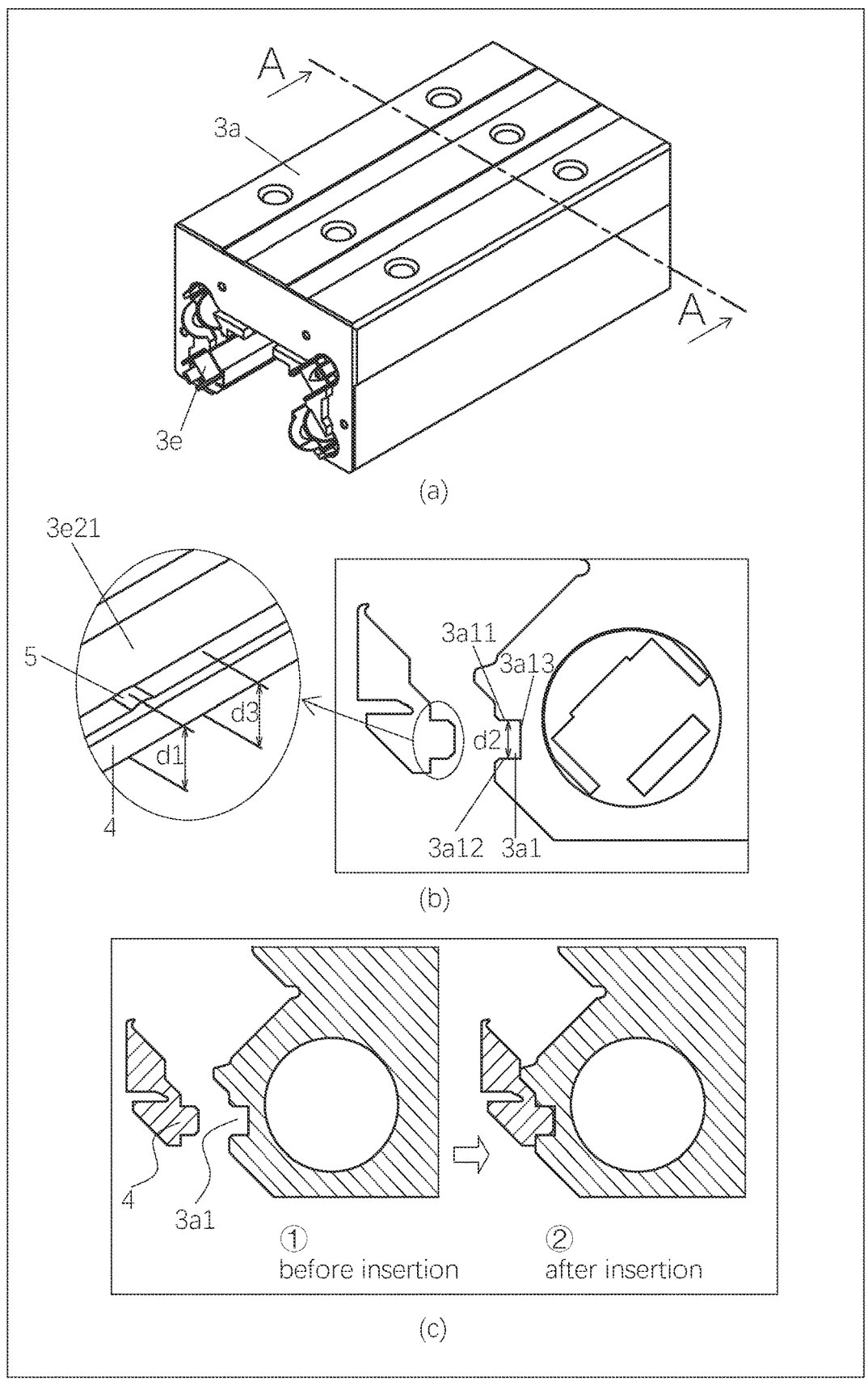
FIG. 8 is a view showing an installation state of the roller holding member shown in FIG. 7 and the movable main body shown in FIG. 4, wherein (a) is a perspective view when the roller holding member is mounted on the movable main body, (b) is a side view showing a dimensional relationship among the protrusion, the convex portion and the opening, (c) is a cross-sectional view taken along the line A-A in (a), showing states before and after the protrusion is inserted into the opening.

Next, specific structures of the convex portion 5 shown in FIG. 7 will be further described with reference to FIG. 8.

FIG. 8(a) is a perspective view of the roller holding member 3e shown in FIG. 7 when it is mounted on the slider 3a shown in FIG. 4, and FIG. 8(b) is a side view showing a dimensional relationship among the protrusion 4, the convex portion 5, and the opening 3a1. As shown in FIG. 8(b), the opening 3a1 has an upper surface 3a11, a lower surface 3a12, and a bottom surface 3a13 connecting the upper surface 3a11 with the lower surface 3a12. The convex portions 5 provided on the protrusion 4 are opposite to the upper surface 3a11 and the lower surface 3a12, respectively. A part of the protrusion 4 with the convex portion 5 has a protrusion width d1, the opening 3a1 has an opening width d2, and a part of the protrusion 4 without the convex portion 5 has a protrusion width d3. A dimensional relationship among the protrusion width d1, the opening width d2 and the protrusion width d3 may include: d1>d2>d3. When the roller holding member 3e shown in FIG. 7 is mounted to the slider 3a shown in FIG. 4, as shown in FIG. 8(c), the protrusion 4 and the opening 3a1 are changed from the state before insertion to the state after insertion. Since the protrusion width d1 of the part of the protrusion 4 with the convex portion 5 is greater than the opening width d2 of the opening 3a1, the part of the protrusion 4 with the convex portion 5 may be securely and firmly engaged into the opening 3a1 due to the elastic deformation of the protrusion 4 and the convex portion 5. In this way, the deformation of the lower roller holding member 3e2 may be suppressed, so as to prevent the roller B from dropping and deviating, and suppress fluctuation in rolling resistance of the roller B.

Further, as the convex portion 5 has been provided, it is possible to make the protrusion width d3 of the part of the protrusion 4 without the convex portion 5 be smaller than the opening width d2 of the opening 3a1. Therefore, interference between the protrusion 4 and the opening 3a1 may be prevented, so that the roller holding member 3e may be easily installed on the movable body 3.

Furthermore, the convex portion 5 preferably has an arc shape as described above, so that the interference between the protrusion 4 and the opening 3a1 may be further prevented, and the roller holding member 3e may be installed on the movable body 3 more easily.

It should be noted that the plurality of convex portion 5 are arranged at an equal interval as described above, but an arrangement of the convex portions 5 is not limited to this, and the plurality of convex portion 5 may be arranged at non-equal intervals.

Furthermore, as shown in FIG. 7, the convex portions 5 are provided on each of two side surfaces of the protrusion 4 of the lower roller holding member 3e2 in the up-down direction orthogonal to the moving direction of the movable body 3. However, it is obvious that the convex portions 5 may be provided on one of the two side surfaces, that is, the convex portions 5 may be provided to be opposite to the upper surface 3a11 or the lower surface 3a12 of the opening 3a1.

Furthermore, although the convex portion 5 preferably has an arc shape as described above, the shape of the convex portion 5 is not limited to this and may have a trapezoidal shape or the like.

Next, a projection 3a2 may be provided at the foot of the slider 3a, which will be specifically described with reference to FIGS. 9 and 10.

Figure 9:
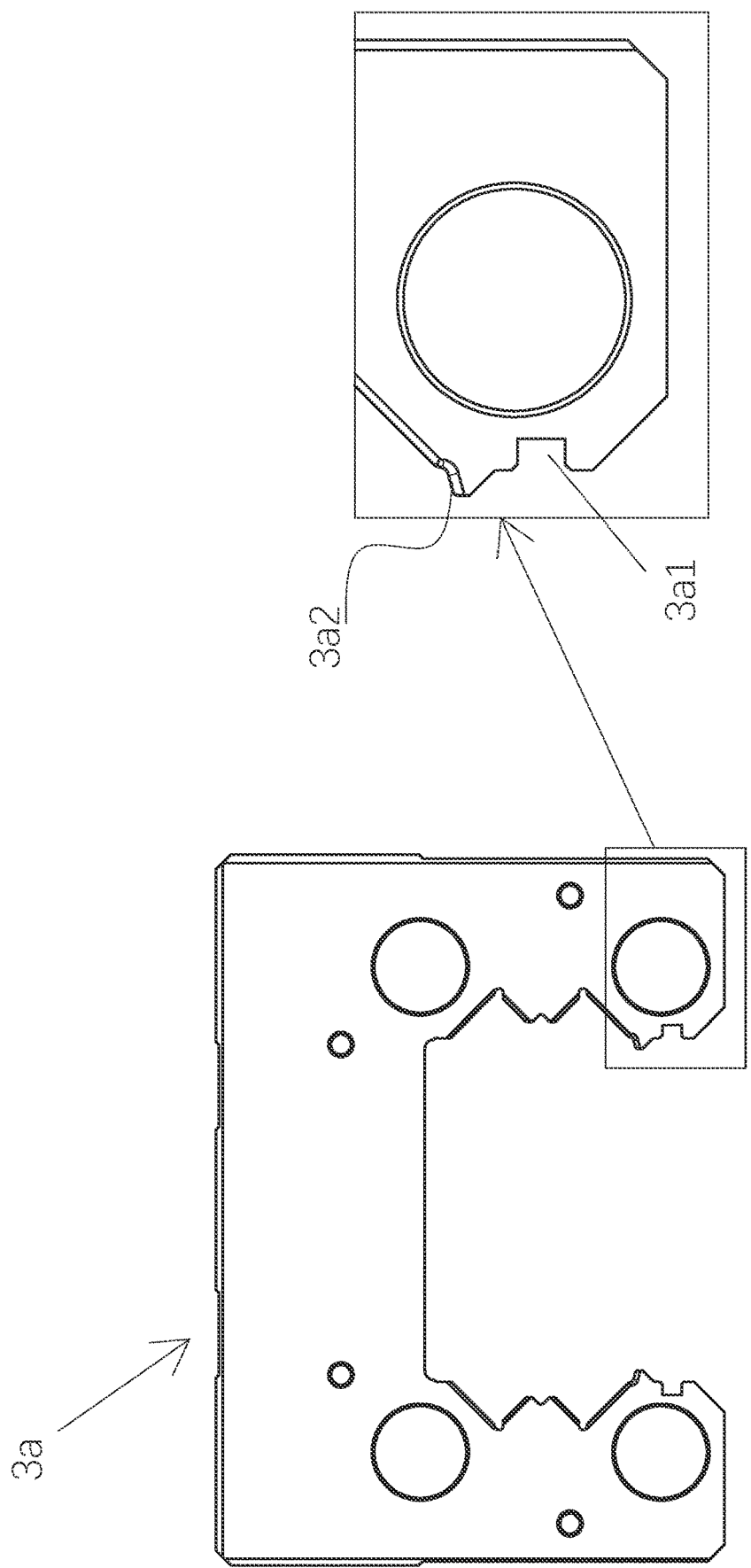
FIG. 9 is a side view of the movable main body of the motion guide device according to other embodiments of the present disclosure, wherein a frame portion represents an enlarged view of a projection provided on a foot of the movable main body.

As shown in FIG. 9, the projection 3a2 is provided at the foot of the slider 3a, more specifically, as shown in FIG. 10, in two lower ones of the four load paths, the projection 3a2 is provided on the slider 3a on a side of the slider-side roller rolling surface 3am close to a center line of the track 2 in a width direction thereof, and the projection 3a2 is opposite to a chamfer Bn on an end surface Bm of the roller B. More specifically, the projection 3a2 refers to a portion that protrudes from an extension line of the slider-side roller rolling surface 3am to be opposite to the chamfer Bn on the end surface Bm of the roller B.

Furthermore, as shown in FIG. 10, the holding member body 3e21 of the lower roller holding member 3e2 has a restriction surface 6 that restricts the end surface Bm of the roller B.

Next, a specific function of the projection 3a2 in the present disclosure will be described with reference to FIG. 10.

The roller B may deviate sometimes when it is rolling in the load path. In conjunction with FIG. 10, due to the action of gravity, the roller B may sometimes move along its central axis in a direction close to the holding member body 3e21, whereby the end surface Bm of the roller B abuts against the restriction surface 6 of the holding member body 3e21, and the holding member body 3e21 is pressed toward the track 2 side. If the pressure of the roller B is so high that it presses the holding member body 3e21 against the track 2, friction may be generated due to a contact between the holding member body 3e21 and the track 2, thereby wearing out the holding member body 3e21, which is usually made of resin, and adversely affecting the movement of the movable body 3 on the track 2.

In the present disclosure, when the roller B rolling in the load path moves along its central axis in the direction close to the holding member body 3e21 due to the action of gravity, the end surface Bm of the roller B first comes into contact with the restriction surface 6 of the holding member body 3e21, so that the roller B presses the holding member body 3e21 toward the track 2 side. Before the roller B further presses the holding member body 3e21 to bring the holding member body 3e21 into contact with the track 2, the chamfer Bn on the end surface Bm of the roller B abuts against the projection 3a2, so that the projection 3a2 prevents the roller B from pressing the holding member body 3e21 into contact with the track 2.

Therefore, in the present disclosure, by providing the projection 3a2 as described above, it is possible to share the force that is applied on the roller holding member 3e by the roller B, to further prevent the deformation of the roller holding member 3e, and to further prevent the roller B from dropping and deviation, and suppress the fluctuation in the rolling resistance of the roller B.

Furthermore, as shown in FIG. 10, both the projection 3a2 and the chamfer Bn are formed of curved lines. Thereby, the projection 3a2 and the chamfer Bn may be processed easily.

Here, another embodiment of the roller holding member 3e will be described by means of FIG. 11.

The roller holding member 3e shown in FIG. 11 is different from the roller holding member 3e shown in FIG. 7 only in that the protrusion 4 at a position where the convex portion 5 is formed is formed in a hollow shape, more specifically, the protrusion 4 at the position where the convex portion 5 is formed is provided with a hollow portion 7.

By forming the protrusion 4 at the position of the convex portion 5 into a hollow shape, the convex portion 5 and the protrusion 4 are more easily elastically deformed, so that the roller holding member 3e may be more easily installed on the movable body 3.

The specific structures of the motion guide device of the present disclosure have been described through the specific embodiments shown in FIGS. 1-11.

As can be seen from the above description, in order to achieve objectives of the present disclosure in which a motion guide device including a protrusion that holds the roller holding member to prevent the rollers from deviation is provided, the present disclosure provides a motion guide device 1, characterized in that it includes a supporting body 2; a movable body 3 that is movable along the supporting body; a roller B, configured to be rollable between the supporting body and the movable body; a roller holding member 3e, which is provided on the movable body to hold the rollers and includes an upper roller holding member 3e1 and a lower roller holding member 3e2. The motion guide device is characterized in that a protrusion 4 is formed on the lower roller holding member, the protrusion 4 is in a length direction of the movable body and opposite to the foot of the movable body, an opening 3a1 is formed in the foot, and the opening 3a1 is opened to the side of the supporting body in the length direction to receive the protrusion, and the protrusion width D1 of the protrusion is greater than the opening width D2 of the opening.

Since the protrusion width D1 of the protrusion 4 is greater than the opening width D2 of the opening 3a1, so that the protrusion 4 may be securely and firmly engaged into the opening 3a1 due to the elastic deformation of the protrusion 4, and the deformation of the lower roller holding member 3e2 may be suppressed, so as to prevent the roller B from dropping and deviation, and suppress the fluctuation in the rolling resistance of the roller B.

Preferably, the opening has an upper surface 3a11, a lower surface 3a12, and a bottom surface 3a13 connecting the upper surface with the lower surface, and the protrusion has at least one of the convex portion 5 opposite to the upper surface and the convex portion 5 opposite to the lower surface.

By providing the convex portion 5, the interference between the protrusion 4 and the opening 3a1 may be prevented, and the roller holding member 3e may be installed on the movable body 3 easily.

Preferably, the supporting body has a supporting body side roller rolling surface 2m, the movable body has a movable body side roller rolling surface 3am opposite to the supporting body side roller rolling surface, the roller is configured to be rollable between the supporting body side roller rolling surface and the movable body side roller rolling surface, and the movable body is provided with a projection 3a2, that is opposite to the chamfer Bn on the end surface Bm of the roller, in the width direction of the movable body side roller rolling surface.

By providing the projection 3a2 as described above, it is possible to share the force that is applied on the roller holding member 3e by the roller B, and to further prevent the deformation of the roller holding member 3e, thereby further preventing the roller B from dropping and deviation, and suppressing the fluctuation in the rolling resistance of the roller B.

Preferably, the convex portion is formed in an arc shape.

By setting the convex portion 5 into an arc shape, the interference between the protrusion 4 and the opening 3a1 may be further prevented, and the roller holding member 3e may be more easily installed on the movable body 3.

Preferably, the protrusion includes a hollow shape at a position where the convex portion is formed.

As the protrusion includes a hollow shape at the position where the convex portion is formed, the convex portion 5 and the protrusion 4 are more easily to be elastically deformed, so that the roller holding member 3e may be installed on the movable body 3 more easily.

As described above, the preferred embodiments of the present disclosure have been fully described with reference to the accompanying drawings, but various variations or changes will be appreciated by those skilled in the art, and these variations or changes should be included in the scope that is defined by the technical solutions of the present disclosure as long as they do not depart from the scope.

What is claimed is:

1. A motion guide device, comprising:
a supporting body;
a movable body which is movable along the supporting body;
at least two rollers which are configured to be rollable between the supporting body and the movable body;
a roller holding member which is provided on the movable body to hold the rollers, wherein the roller holding member comprises an upper roller holding member and a lower roller holding member,
the motion guide device is characterized in that:
a protrusion is formed on the lower roller holding member, the protrusion protrudes toward a foot of the movable body and has a length extending along a length direction of the movable body, the protrusion further including a protrusion width in a direction perpendicular to the length direction,
an opening is formed on the foot, the opening is opened toward a side of the supporting body and extends in the length direction to receive the protrusion,
wherein the opening has an upper surface, a lower surface, and a bottom surface connecting the upper surface with the lower surface, and
the protrusion has a plurality of convex portions opposite to at least one of the upper surface or the lower surface, and the plurality of convex portions are arranged on the protrusion at a predetermined interval in the length direction, and
wherein the protrusion width where each convex portion is formed is greater than an opening width of the opening and the protrusion width at another portion of the protrusion without the convex portions is less than the opening width of the opening.

2. The motion guide device of claim 1, characterized in that, the supporting body has a supporting body side roller rolling surface, the movable body has a movable body side roller rolling surface opposite to the supporting body side roller rolling surface, at least one of the rollers is configured to be rollable between the supporting body side roller rolling surface and the movable body side roller rolling surface, and a projection is provided on the movable body in a width direction of the movable body side roller rolling surface, and the projection is opposite to a chamfer on an end surface of the at least one roller.

3. The motion guide device of claim 2, characterized in that, at least one of the convex portions is formed into an arc shape.

4. The motion guide device of claim 3, characterized in that, the protrusion comprises a hollow shape at a position where at least one of the convex portions is formed.

* * * * *